May. 5, 1925.
R. J. DOUGHERTY
1,536,826
THERMOSTATICALLY CONTROLLED FUEL VALVE
Filed Aug. 7, 1924         2 Sheets-Sheet 2
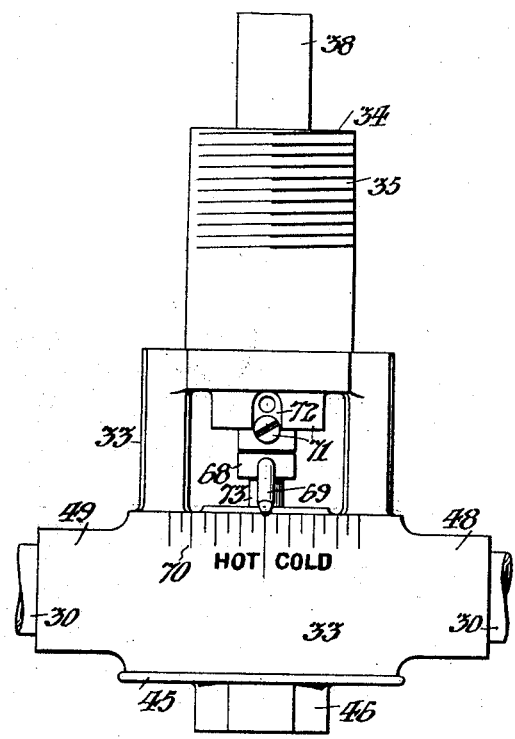
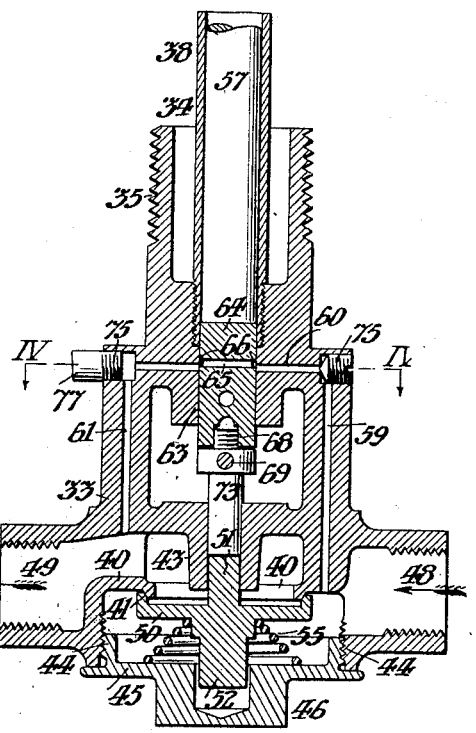
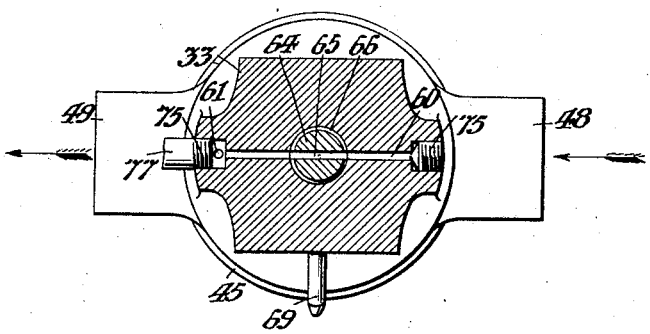
INVENTOR:
ROBERT J. DOUGHERTY,

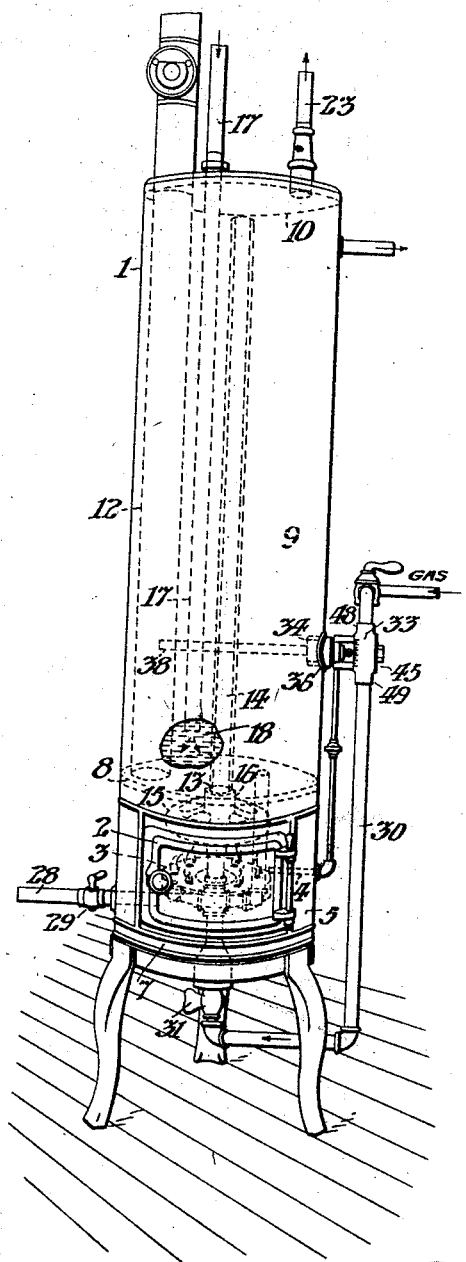

Patented May 5, 1925.

1,536,826

UNITED STATES PATENT OFFICE.

ROBERT J. DOUGHERTY, OF PHILADELPHIA, PENNSYLVANIA.

THERMOSTATICALLY-CONTROLLED FUEL VALVE.

Application filed August 7, 1924. Serial No. 730,772.

*To all whom it may concern:*

Be it known that I, ROBERT J. DOUGHERTY, a citizen of the United States residing at Philadelphia, in the county of Philadelphia and State of Pennsylvania, have invented a certain new and useful Improvement in Thermostatically-Controlled Fuel Valves, whereof the following is a specification, reference being had to the accompanying drawings.

My invention is designed and adapted for use in connection with a gas water heater included in a house water supply system and comprising a container which is a hot water reservoir; with the object and effect of regulating the temperature of the water stored in said reservoir.

As hereinafter described, my invention includes the combination with a water container; of a burner arranged to heat the water in said container; a main gas valve controlling a main fuel gas conduit leading to said burner; a bypass conduit leading to said burner around said main valve; an auxiliary valve controlling said bypass conduit; a spring arranged to normally close said main valve; a single thermostatic element, extending in said container, and in operative relation with both said valves, arranged to continually hold said auxiliary valve open, but thereby vary the effective area of said bypass, in accordance with the temperature of the water in said container, and arranged to open said main valve at a predetermined temperature, and permit said main valve to be closed, by said spring, at a predetermined temperature; and means adjustable to variably determine the temperatures at which said valves shall be respectively operated, in coordinated relation, by said thermostatic element; whereby the heating effect of said burner is automatically determined and controlled to regulate the temperature of the water in said container and compensate for fluctuations in such temperature consequent upon withdrawal of hot water and influx of cold water with respect to said container.

My invention includes the various novel features of construction and arrangement hereinafter more definitely specified.

In said drawings; Fig. I is a diagrammatic perspective view of a gas water heater embodying my improvements.

Fig. II is a plan view of the thermostatically controlled fuel valve structure as indicated in Fig. I; showing the same in elevation.

Fig. III is an axial sectional view of said valve structure.

Fig. IV is a transverse sectional view of said valve structure, taken on the lines IV, IV in Figs. II and III.

I have found it convenient to illustrate my invention in Fig. I with reference to a gas water heater of the general construction and arrangement claimed in my copending application Serial No. 616,242 filed February 1, 1923 for Letters Patent of the United States. In said figure; the cylindrical tubular casing shell 1 has the door 2 in its circumference, affording access to the burner 3 which is mounted within the burner compartment 5 in said shell. Said burner compartment is formed by the skirt portion 7 of said shell extending below the partition 8 and including the opening for said door. Said partition 8 forms the bottom closure of the water container compartment 9 in said shell, which has the top closure 10. The flue pipe 12 for the escape of products of combustion from said burner 3 extends through said water compartment 9, parallel with the axis of said casing, but in eccentric relation thereto, and is conveniently rigidly connected with said closures 8 and 10 by welded joints. Said partition 8 has the axial screw threaded opening 13 for the hot water inlet pipe 14 extending upwardly from the water spreader 15, which is interposed between said burner 3 and said partition 8 and has the axial flange 16 provided with an external screw thread fitted to said opening 13. The pipe 17, which is rigidly connected with the top closure 10 of said water container 9, extends nearly to the bottom closure 8 of said container so as to supply the latter with cold water 18 from a municipal or other source.

Of course, any water heated in the structure above described is correspondingly expanded and tends to rise to the top of said container 9; while the relatively cold water 18 gravitates into said spreader 15 through the axial opening within said flange 16 and is distributed radially outward by a diaphragm in said spreader so that it reaches the bottom convex wall of said spreader at its outer circumference and gravitates thence downwardly toward the center of said spreader.

The construction and arrangement of said spreader 15 are such that the cold water thus flowing into said spreader at the perimeter thereof, is heated so as to rise in said axial hot water pipe 14 which extends nearly to the top of said container 9, so that hot water rising through said pipe 14 may be almost directly drawn off through the pipe 23 which leads to the dispensing faucets.

Of course, expansion of the water 18 within said spreader 15 causes precipitation of any solid matter which is normally suspended and carried in the water. Therefore, to enable the operator to eliminate any sediment deposited in the spreader, which would detract from its efficiency of operation; I provide the bottom of the spreader with the drain pipe 28 which has the stop cock 29 exterior to said casing 1, so that, by opening said stop cock, any sediment in the spreader may be rinsed out with the water thus drawn directly downward therethrough.

In the form of my invention indicated in Fig. I; the burner 3 is supplied with gas through the pipe 30, under manual control of the stop cock 31, but also under automatic control of the thermostatically operative fuel valve having the casing 33. Said casing 33 has the tubular extension 34 provided with the screw head 35 detachably fitted in water-tight relation with the spud 36 in said heater shell 1; so that the thermostatic tube 38 extends horizontally in the water 18 in the container 9 but in tangential relation with a circle larger than the outside diameter of said pipe 14, so as to clear the latter.

Said valve casing 33 has the internal partition 40 with the circular main valve seat 41 thereon in coaxial relation with the valve stem bearing 43 and the internally screw threaded seat 44 for the removable closure plug 45, which latter has the wrench hold 46 exterior to said casing. Said valve casing 33 also has the internally screw threaded pipe inlet seat 48 and pipe outlet seat 49 at respectively opposite sides thereof, leading from respectively opposite sides of said partition 40.

The main gas valve 50 is a disk fitted to said valve seat 41 and having two axial stems 51 and 52 projecting from respectively opposite sides thereof; said stem 51 being fitted to slide in said axial stem bearing 43. Said valve stem 52 merely serves to engage the spiral spring 55 which is compressed between said plug 45 and said valve 50 and normally tends to close said valve upon its seat and thus shut off the gas supply to said burner 3.

Said main valve 50 is arranged to be automatically operated by the thermostatic couple including said tube 38, which is conveniently formed of copper, and the carbon rod 57 which is connected to said tube 38 at its end remote from said valve casing 33, so that said rod 57 is moved axially back and forth in accordance with the contraction and expansion of said tube 38; the expansion and contraction of said rod being practically negligible within the range of temperatures to which said couple is subjected in the embodiment described. Ordinarily, it is desired to permit said main gas valve 50 to be closed by its spring 55 whenever the water 18 in the container 9 reaches 170° F., and to open said valve, automatically, by the operation of said thermostatic couple, whenever the temperature of said water falls below 170° F. That result might be attained by extending the stem 51 of said valve 50 so that it contacts with the adjacent end of said carbon rod 57 when the valve is in the closed position shown in Fig. III and the water at a temperature of 170° F., as any decrement in that temperature of the water would cause the copper tube 38 to contract and thrust said rod 57 against the valve stem 51 to open the valve. However, a device of that simple character is not commercially practicable, for the reason that the flame at the burner 3 would be extinguished every time said valve 50 closed, and unconsumed gas would be discharged through the burner whenever said valve 50 was thus automatically opened, unless the gas be manually lighted which, of course, would require the constant attendance of an operator. Therefore, attempts have been made to solve that difficulty by providing a bypass conduit around the main valve leading to what is termed a "pilot light", viz., a small burner 4, independent of the larger burner 3, but so located with respect thereto, that it serves to ignite gas discharged through said burner 3 whenever the main valve is opened. However, those double burner structures have been found objectionable, because no provision is made therein for automatically varying the volume of gas delivered to such pilot lights in accordance with the temperature of the water heated and the pressure and flow of gas not only differs in different locations of such heaters but fluctuates through a considerable range in any location and, consequently, it is impossible to predetermine the rate of flow of gas to such a pilot light so that it shall be sufficient to prevent said light from being accidentally extinguished and not more than is needed for heating the water. Therefore, it has been found necessary to supply such a double burner, for an ordinary household gas water heater, with an average of fifty cubic feet of gas per hour; a large portion of which is wasted because the heat of its combustion is not entirely absorbed by the water and passes off with the products of combustion from the heater.

Therefore, I provide means to automatically control the flow of all of the gas consumed whenever the valve 31 is manually opened and the initial flow of gas ignited at the burner or burners. In the form shown, the water may be heated by the single burner 3 without using said pilot burner 4, and the flow of fuel gas to that single burner is controlled not only by the main valve 50 aforesaid but by an auxiliary valve controlling a by-pass around the main valve; both the volume of gas through said main valve port and through the bypass being automatically variably determined by the same thermostatically operative means.

Therefore, as shown in Fig. III; I form a bypass conduit in said casing 33 by drilling three holes respectively 59, 60 and 61 therein; leading from the inlet to the outlet side of said partition 40 and through the seat 63 for the cylindrical plunger valve 64 by which the effective area of said bypass conduit is varied.

As indicated in Figs. III, IV and V; said valve 64 is a cylindrical metal body having its end adjoining said carbon rod 57 rigidly connected therewith, conveniently by solder connecting with an electroplated copper film on said rod. Said valve body 64 has the port 65 comprising a drilled hole extending diametrically therethrough and in communication with an annular groove 66 in the circumference of said body. Said valve body 64 being thus a fixture upon the end of said carbon rod 57; I provide it with means to manually adjustably vary its effective length, including the screw 68 which is axially adjustable in coaxial relation with said body at the end thereof remote from said rod. Said screw 68 may be turned by its index arm 69 which projects radially therefrom and has its outer end overhanging the scale of graduations 70 on said casing as indicated in Fig. II. The set screw 71 is in screw threaded engagement with said valve body 64 in such position that it may be used to clamp said screw 68 in its adjusted position. Said screw 71 also serves to prevent rotation of said valve body 64, while permitting axial movement thereof throughout the desired range, by engagement with the notch 72 in said bearing 63.

Although said valve stem 51 may be of such length as to reach the head of said screw 68; as a matter of economy in cost of construction thereof; I prefer to make said stem 51 shorter, as indicated, and supplement it by a push rod 73, which extends between the end of said stem 51 and said screw 68. It is to be understood that the rotary adjustment of said screw 68 is effective to predetermine the precise degree of heat of the water 18 at which said main valve 50 may be permitted to close under pressure of its spring 55 and, as above noted, that critical temperature is ordinarily 170° F. However, by retracting said screw 68 from said valve body 64, more or less, said valve 50 may be thereby held off its seat 41 until the water 18 reaches a correspondingly higher temperature and, conversely, by shifting said screw 68 further into said valve body 64; said main valve 50 may be permitted to be closed by its spring 55 at a lower temperature than 170° F. The range of that adjustment is indicated by the extent of said scale 70, to wit, about one-third of a revolution of said screw 68. However, it is to be understood that a greater range of adjustment may be attained by employing push pieces 73 of different lengths.

I find it preferable to so calibrate the automatically operative structure above described that the outer edge of the groove 66 in the valve body 64 is presented half way across the cylindrical port 60 at the normal temperature of 170° F.; so that after the main valve 50 is closed with said valve 64 in that position; any further increment in temperature of the water 18 surrounding the thermostatic couple elongates the copper tube 38, causing the carbon rod 57, which is attached at the inner end thereof, to draw said valve 64 inwardly and thus rapidly reduce the remaining semicircular area of said port 60 with consequent reduction of the volume of gas supplied through the bypass to said burner 3 and thus prevent overheating the water and the waste of gas and danger to the apparatus which would be consequent upon such overheating.

As shown in Fig. III; the opposite ends of said bypass port 60 are closed with respective screws 75, and I find it convenient to form a conical point at the inner end of each of said screws so that either of them may be used to variably restrict the effective area of said port 60, in accordance with their axial adjustment. That is to say; said screws 75 may be retracted to leave the full circular area of said ports 60 unobstructed, or said screws may be inserted to restrict the effective area of said port 60 more or less down to the minimum. Of course, such manual adjustment of the effective area of the bypass is entirely independent of the automatic control thereof by the valve 64 and its appurtenances above described.

It is to be noted that whereas the ordinary thermostatically controlled gas water heater, for household use, consumes an average of fifty cubic feet of gas per hour, with considerable waste for the reasons above recited; I find it possible to operate a heater in accordance with my invention to supply substantially the same quantity of hot water as such ordinary heaters by the consumption of not more than twenty-five cubic feet of gas per hour, when the container 9 is provided with a suitable exterior jacket of heat insulating material. In such embodiment; the maximum area of the bypass conduit is such as to supply the burner 3 at the rate of ten cubic feet per hour, but the effective area of said bypass is variably limited as above described so that when the main valve 50 is closed by the automatic operation of the device at the critical temperature of 170° F.; the water in the container may be maintained at that temperature by comsumption of gas at the rate of approximately two cubic feet per hour until the heated water is withdrawn, permitting cold water to enter the container 9;. whereupon, both valves 50 and 64 are opened to permit the maximum flow of fuel gas to the burner 3 at the rate of twenty-five cubic feet per hour until the water in the container 9 is restored to the desired temperature. However, it is to be understood that I do not desire to restrict the use of my invention to such small gas consumption or to the temperature range above described, as the adjustable devices specified permit the operation of the heater to maintain the water 18 at any desired temperature.

Although I have shown a main valve 50 and an auxiliary valve 64 both in communication with a single gas inlet and a single gas outlet leading to a single burner; of course, the bypass conduit may lead to said pilot burner 4, distinct from said main burner 3. For instance, a pipe 77 leading to said burner 4 may be substituted for the screw 75 at the right hand side of Fig. III.

Moreover, although I have found it convenient to illustrate my thermostatically operative valve in conjunction with a water heater of a specific type; it is to be understood that I do not desire to limit myself to that embodiment, as it is obvious that such valves may be used for other purposes, and various modifications may be made therein without departing from the essential features of my invention, as defined in the appended claims.

I claim:

1. In a gas water heater; the combination with a water container; of a burner arranged to heat the water in said container; a main gas valve controlling a main fuel gas conduit leading to said burner; a bypass conduit leading to said burner, around said main valve; an auxiliary valve controlling said bypass conduit; a spring normally tending to close said main valve; a single thermostatic element extending in said container and in operative relation with both said valves, arranged to continually hold said auxiliary valve open, but thereby vary the effective area of said bypass, in accordance with the temperature of the water in said container, and arranged to open said main valve at a predetermined temperature, and permit said main valve to be closed, at a predetermined temperature, by said spring; and means adjustable to variably determine the temperatures at which said valves shall be operated; whereby the heating effect of said burner is automatically determined and controlled to regulate the temperature of the water in said container and compensate for variations in such temperature, consequent upon withdrawal of hot water and influx of cold water with respect to said container.

2. In a gas water heater; the combination with a water container; of a burner arranged to heat the water in said container; a main gas valve controlling a main fuel gas conduit leading to said burner; a bypass conduit leading to said burner, around said main valve; an auxiliary valve controlling said bypass conduit; a spring normally tending to close said main valve; a thermostatic element extending in said container and in operative relation with both said valves, arranged to continually hold said auxiliary valve open, but thereby vary the effective area of said bypass, in accordance with the temperature of the water in said container, and arranged to open said main valve at a predetermined temperature, and permit said main valve to be closed, at a predetermined temperature, by said spring; whereby the heating effect of said burner is automatically determined and controlled to regulate the temperature of the water in said container and compensate for variations in such temperature, consequent upon withdrawal of hot water and influx of cold water with respect to said container.

3. In a gas water heater; the combination with a water container; of a burner arranged to heat the water in said container; a main gas valve controlling a main fuel gas conduit leading to said burner; a bypass conduit leading to said burner, around said main valve; an auxiliary valve controlling said bypass conduit; a thermostatic element in operative relation with both said valves, arranged to continually hold said auxiliary valve open, but thereby vary the effective area of said bypass, in accordance with the temperature of the water in said container, and arranged to open said main valve at a predetermined temperature, and permit said main valve to be closed, at a predetermined temperature; and means adjustable to variably determine the temperature at which said valve shall be operated; whereby the heating effect of said burner is automatically determined and controlled to regulate the temperature of the water in said container and compensate for variations in such temperature, consequent upon withdrawal of hot water and influx of cold water with respect to said container.

4. In a gas water heater; the combination with a water container; of a burner arranged to heat the water in said container; a main gas valve controlling a main fuel gas conduit leading to said burner; a bypass conduit leading to said burner, around said main valve; an auxiliary valve controlling said bypass conduit; and a thermostatic element in operative relation with both said valves, arranged to continually hold said auxiliary valve open, but thereby vary the effective area of said bypass, in accordance with the temperature of the water in said container, and arranged to open said main valve at a predetermined temperature, and permit said main valve to be closed, at a predetermined temperature; whereby the heating effect of said burner is automatically determined and controlled to regulate the temperature of the water in said container and compensate for variations in such temperature, consequent upon withdrawal of hot water and influx of cold water with respect to said container.

5. The combination with a valve casing; of a main gas valve controlling a main gas conduit in said casing; a bypass conduit around said main valve; an auxiliary valve controlling said bypass conduit; a spring normally tending to close said main valve; a thermostatic element in operative relation with both said valves, arranged to continually hold said auxiliary valve open, but thereby vary the effective area of said bypass, in accordance with the temperature, and arranged to open said main valve at a predetermined temperature, and permit said main valve to be closed, at a predetermined temperature, by said spring; and means adjustable to variably determine the temperatures at which said valve shall be operated; whereby the heating effect of said burner is automatically determined and controlled to regulate the temperature of the water in said container and compensate for variations in such temperature, consequent upon withdrawal of hot water and influx of cold water with respect to said container.

6. The combination with a valve casing; of a main gas valve controlling a main gas conduit in said casing; a bypass conduit around said main valve; an auxiliary valve controlling said bypass conduit; a spring normally tending to close said main valve; and a thermostatic element in operative relation with both said valves, arranged to continually hold said auxiliary valve open, but thereby vary the effective area of said bypass, in accordance with the temperature, and arranged to open said main valve at a predetermined temperature, and permit said main valve to be closed, at a predetermined temperature, by said spring; whereby the heating effect of said burner is automatically determined and controlled to regulate the temperature of the water in said container and compensate for variations in such temperature, consequent upon withdrawal of hot water and influx of cold water with respect to said container.

7. The combination with a valve casing; of a main gas valve controlling a main fuel gas conduit; a bypass conduit around said main valve; an auxiliary valve controlling said bypass conduit; a spring normally tending to close said main valve; a thermostatic couple including a copper tube fixed at one end in said casing, and a carbon rod fixed at one end in said tube, and attached at the other end to said auxiliary valve and in operative relation with both said valves, arranged to continually hold said auxiliary valve open, but thereby vary the effective area of said bypass, in accordance with the temperature, and arranged to open said main valve at a predetermined temperature, and permit said main valve to be closed, at a predetermined temperature; and adjustable means, including a screw axially adjustable in said auxiliary valve, arranged to variably determine the temperatures at which said valves shall be operated.

8. The combination with a valve casing; of a main gas valve controlling a main fuel gas conduit; a bypass conduit around said main valve; an auxiliary valve controlling said bypass conduit; a thermostatic couple including a copper tube fixed at one end in said casing, and a carbon rod fixed at one end in said tube, and attached at the other end to said auxiliary valve and in operative relation with both said valves, arranged to continually hold said auxiliary valve open, but thereby vary the effective area of said bypass, in accordance with the temperature, and arranged to open said main valve at a predetermined temperature, and permit said main valve to be closed, at a predetermined temperature; and adjustable means, including a screw axially adjustable in said auxiliary valve, arranged to variably determine the temperatures at which said valves shall be operated.

9. The combination with a valve casing; of a main gas valve controlling a main fuel gas conduit; a bypass conduit around said main valve; an auxiliary valve controlling said bypass conduit; a spring normally tending to close said main valve; and a thermostatic couple including a copper tube fixed at one end in said casing, and a carbon rod fixed at one end in said tube, and attached at the other end to said auxiliary valve and in operative relation with both said valves, arranged to continually hold said auxiliary valve open, but thereby vary the effective area of said bypass, in accordance with the temperature, and arranged to open said main valve at a predetermined temperature, and permit said main-valve to be closed, at a predetermined temperature, by said spring; and adjustable means arranged to variably determine the temperatures at which said valves shall be operated.

10. The combination with a valve casing; of a main gas valve controlling a main fuel gas conduit; a bypass conduit around said main valve; an auxiliary valve controlling said by-pass conduit: a spring normally tending to close said main valve; and a thermostatic couple including a copper tube fixed at one end in said casing, and a carbon rod fixed at one end in said tube, and attached at the other end to said auxiliary valve and in operative relation with both said valves, arranged to continually hold said auxiliary valve open, but thereby vary the effective area of said bypass, in accordance with the temperature, and arranged to open said main valve at a predetermined temperature, and permit said main valve to be closed, at a predetermined temperature, by said spring.

11. The combination with a valve casing; of a main gas valve controlling a main fuel gas conduit; a bypass conduit around said main valve; an auxiliary valve controlling said bypass conduit; and a thermostatic couple including a copper tube fixed at one end in said casing, and a carbon rod fixed at one end in said tube, and attached at the other end to said auxiliary valve and in operative relation with both said valves, arranged to continually hold said auxiliary valve open, but thereby vary the effective area of said bypass, in accordance with the temperature, and arranged to open said main valve at a predetermined temperature, and permit said main valve to be closed, at a predetermined temperature.

12. The combination with a valve casing; of a main gas valve controlling a main fuel gas conduit; a bypass conduit around said main valve; an auxilary valve controlling said bypass conduit; and a thermostatic couple including a copper tube fixed at one end in said casing, and a carbon rod fixed at on end in said tube, and attached at the other end to said auxiliary valve and in operative relation with both said valves.

13. The combination with a valve casing; of a main gas valve controlling a main fuel gas conduit; a bypass conduit around said main valve; an auxiliary valve controlling said bypass conduit; and a thermostatic couple including a tube fixed at one end in said casing, and a rod fixed at one end in said tube, and attached at the other end to said auxiliary valve and in operative relation with both said valves.

14. The combination with a valve casing; of a main gas valve controlling a main fuel gas conduit; a bypass conduit around said main valve; an auxiliary valve controlling said bypass conduit; and a single thermostat arranged to control both said valves, in succession.

15. The combination with a valve casing; of a main gas valve controlling a main fuel gas conduit; a bypass conduit around said main valve; an auxiliary valve controlling said bypass conduit; and a thermostatic couple including a tube fixed at one end in said casing, and a rod fixed at one end in said tube, and attached at the other end to said auxiliary valve, arranged to open and partly close said auxiliary valve, and to open said main valve at predetermined temperatures.

In testimony whereof, I have hereunto signed my name at Philadelphia, Pennsylvania, this eighteenth day of July, 1924.

ROBERT J. DOUGHERTY.

Witnesses:
ARTHUR E. PAIGE,
CAROLINE E. REUTER.